United States Patent [19]

Tahara et al.

[11] 3,920,756

[45] Nov. 18, 1975

[54] METHOD FOR PREPARING CATECHOL AND HYDROQUINONE

[75] Inventors: Susumu Tahara; Shigeki Nagai; Yurio Hayashi; Kou Hoshide; Shigenori Kawazoe; Katsuzo Harada; Koichi Yamamoto, all of Ube, Japan

[73] Assignee: Ube Industries, Ltd., Yamaguchiken, Japan

[22] Filed: Mar. 13, 1974

[21] Appl. No.: 450,751

[30] Foreign Application Priority Data
Mar. 23, 1973 Japan.............................. 48-32601

[52] U.S. Cl. ...... 260/621 G; 252/431 R; 252/431 C; 252/431 N
[51] Int. Cl.$^2$ ........................................ C07C 37/00
[58] Field of Search. 260/621 G; 252/431 R, 431 C, 252/431 N

[56] References Cited
UNITED STATES PATENTS

| | | | |
|---|---|---|---|
| 3,488,395 | 1/1970 | Hooper | 260/621 G |
| 3,531,519 | 9/1970 | Parkin et al. | 260/621 G |
| 3,585,243 | 6/1971 | Gradeff | 260/621 G |
| 3,600,447 | 8/1971 | Vesely | 260/621 G |

*Primary Examiner*—Norman P. Morgenstern
*Attorney, Agent, or Firm*—Burgess, Ryan and Wayne

[57] ABSTRACT

A mixture of catechol and hydroquinone is prepared by oxidizing phenol in an aqueous medium with hydrogen peroxide at a pH of 6.0 or lower in the presence of a catalyst consisting of at least one organic metal coordinate compound which is prepared from a salt of a metal selected from the class consisting of iron, copper, chromium and cobalt and an organic ligand compound selected from the class consisting of aromatic chelating compounds, heterocyclic monodentate coordinating compounds, heterocyclic polydentate chelating compounds and aliphatic chelating compounds, when one of the coordinate bonding groups in the aliphatic chelating compound is the carbonyl group, the remaining coordinate atoms or groups are other than the carbonyl group, and isolating the resulting catechol and hydroquinone from the oxidation admixture.

13 Claims, No Drawings

METHOD FOR PREPARING CATECHOL AND HYDROQUINONE

The present invention relates to a method for preparing catechol (pyrocatechol, pyrocatechin or 1,2-dihydroxybenzene) and hydroquinone (hydroquinol or 1,4-dihydroxybenzene), more particularly, it relates to a method for preparing catechol and hydroquinone by directly oxidizing phenol with hydrogen peroxide.

In the known method wherein phenol is directly oxidized with hydrogen peroxide in the absence of metal ion, it is desirable that the reaction system contains substantially no or a very small amount of water. The increase in water content of the reaction system results in a noticeable decrease in yields of catechol and hydroquinone. For example, if the reaction system contains 30% by weight of water, substantially no catechol and hydroquinone are obtained. Under this circumstance, it is required that phenol be used in a large excess amount based on the amount of hydrogen peroxide used, or a non-aqueous solvent is used as a reaction medium. Further, it is required that materials to be added to the reaction system contain water in an amount as small as possible. These requirements for the above-mentioned method result in various economical disadvantages, that is, low heat efficiency, undesirable necessity of recovery of unreacted phenol, high cost of the non-aqueous solvent and low yield of catechol and hydroquinone.

Further, it should be noted that the above-mentioned method requires the use of a highly concentrated aqueous hydrogen peroxide solution, because the use of low concentration aqueous solution of hydrogen peroxide causes low yields of catechol and hydroquinone and a low reaction rate in the oxidation of phenol. However, such a highly concentrated aqueous solution of hydrogen peroxide is accompanied by a high risk of explosion during handling.

I. Tanimoto, Bull. *Chem. Soc. Japan*, 43, 139 – 142 (1970), discloses the phenomenon that small amounts of catechol and hydroquinone are produced by oxidizing phenol with hydrogen peroxide in the presence of copper nitrate.

A. Chwala et al, *J. Prakt. Chem.* 152, 45 (1939), obtained catechol and hydroquinone by reacting, while cooling with ice, hydrogen peroxide with phenol in an excess amount with respect to that of hydrogen oxide, in a considerably diluted solution in the presence of ferrous sulfate over a period of 24 hours. However, the Chwala method which needs a very long reaction time is very disadvantageous from the point of view of economy. During the inventor's studies of the Chwala method, it has been observed that the oxidation reaction starts a long period of time after the complete mixing of phenol and hydrogen peroxide. This period of time during which the oxidation is not effected, is referred to as "induction period." Owing to the induction period, the Chwala method requires a very long time, for example, 24 hours, to complete the oxidation of phenol. However, it is desirable that the oxidation is completed within a short time.

The object of the present invention is to provide a method for preparing catechol and hydroquinone by directly oxidizing phenol at a high yield within a short reaction time period.

The other object of the present invention is to provide a method for preparing catechol and hydroquinone by directly oxidizing phenol using a relatively low concentration of an aqueous hydrogen peroxide solution.

The above object is accomplished by the method of the present invention which comprises the steps of oxidizing phenol, to produce catechol and hydroquinone, with hydrogen peroxide in an aqueous medium at a pH not higher than 6.0 in the presence of a catalyst consisting of at least one organic metal coordinate compound which consists of a metal component selected from the group consisting of iron, copper, chromium and cobalt and at least one organic ligand component selected from the class consisting of aromatic chelating compounds having at least two chelate-bonding atoms or groups, heterocyclic coordinating compounds having at least one coordinate-bonding atom or group and aliphatic chelating compounds having at least two chelate-bonding atoms or groups, when one of the chelate-bonding group of said aliphatic compounds is a carbonyl group, the remaining chelate-bonding group is other than the carbonyl group, and isolating the resultant catechol and hydroquinone from the oxidizing mixture.

The catalyst consisting of the organic metal coordinate compounds usable for the method of the present invention may be prepared by bringing at least one metal compound into contact with at least one organic ligand compound in an aqueous medium in accordance with a conventional method. The metal compound usable for the preparation of the organic metal coordinate compound may be selected from organic or inorganic acid salts of iron, copper, chromium and cobalt, for example, chlorides, nitrates, phosphates, sulfates, carbonates, bicarbonates and carboxylates of the above stated metals.

The aromatic chelating compounds usable for the preparation of the catalyst are polydentate chelating compounds having at least two chelate-bonding atoms or groups and may be selected from the group consisting of, for example, catechol, salicylic aldehyde, salicylic acid, thiosalicylic acid, o-aminophenol, salicylic amide, o-nitrophenol, anthranilic acid, orthanilic acid, o-phenol sulfonic acid and $\alpha$-nitroso-$\beta$-naphthol.

The heterocyclic coordinating compounds usable for the preparation of the catalyst are heterocyclic monodentate coordinating compounds which have only one coordinatebonding atom or group or heterocyclic polydentate chelating compounds which have two or more chelate-bonding atoms or groups.

The heterocyclic monodentate coordinating compounds usable for the present invention may be selected from the class consisting of, for example, pyridine, picolines, lutidines and quinoline.

The hetrocyclic polydentate chelating compounds usable for the present invention may be selected from the class consisting of, for example, nicotinic acid, nicotinic amide, isocinchomeronic acid, $\alpha$-thiophenic acid, o-phenanthroline, 2-mercaptopyridine, 2-aminothiazole, 8-hydroxyquinoline, mercaptobenzothiazole and $\epsilon$-caprolactam.

The aliphatic chelating compounds usable for the present invention have at least two chelate-bonding atoms or groups, when one of the chelate-bonding group is a carbonyl group, the remaining chelate-bonding atoms or groups are other than carbonyl group. The aliphatic chelating compounds may be selected from the class consisting of, for example, ethylenediamine, D,L-$\alpha$-alanine, D,L-$\beta$-alanine, 2,2',2''-trihydroxyethylamine, thioglycollic acid, thioacetamide, thiourea, 2,3-dimercapto-1-propanol, ethylenediaminetetraacetic acid, dimethylglyoxime, 2-hydroxyethylamine, ethylene cyanohydrin, oxamide, diethylene glycol, glutamic acid, lysine, methionine, glycine and arginine.

The reaction admixture wherein phenol is oxidized with hydrogen peroxide is prepared by mixing the organic metal coordinate compound and phenol within an aqueous medium and, then, admixing an aqueous solution of hydrogen peroxide, or by mixing phenol with hydrogen peroxide within an aqueous medium and, then, admixing the organic metal coordinate compound.

Phenol to be added may be in the state of solid, liquid or an aqueous solution. Phenol in the reaction admixture is preferably in a concentration of 0.2 to 30 mole, more preferably, 0.3 to 10 mole based on 1000 ml of water. Water in the reaction admixture may be supplied together with phenol, hydrogen peroxide, the organic ligand compound, the metal compound or acid for adjusting pH or alone, into the reaction vessel.

Hydrogen peroxide to be added to the reaction system is preferably in an amount of 0.1 to 1 mole, more preferably, 0.15 to 0.8 mole with respect to 1 mole of phenol. Generally, hydrogen peroxide is added in the state of an aqueous solution in a concentration of, preferably, 20 to 60% by weight to the reaction system. The aqueous hydrogen peroxide solution may be added by drops or at once to the reaction system.

The amount of the organic metal coordinate compound to be present in the reaction admixture is adjusted in response to the types of metal and ligand contained in the coordinate compound, reaction temperature and time and concentrations of phenol and hydrogen peroxide. Generally, the organic metal coordinate compound is used in an amount of 0.003 to 1 mole, calculated in terms of the metal atoms in said compound, with respect to 1 mole of phenol.

The absence of the organic metal coordinate compounds as specified hereinbefore in the reaction mixture results in substantially no oxidation of phenol. If the reaction is carried out in the presence of only a metal salt such as copper nitrate, instead of the organic metal coordinate compound, catechol and hydroquinone is produced in a low yield, and a very long time is necessary for the complete oxidation.

The reaction admixture is adjusted to a pH not higher than 6.0, preferably, of 1.0 to 5.0, by adding an aqueous solution of an inorganic acid, for example, hydrochloric acid, nitric acid, phosphoric acid or sulfuric acid, or organic acid, for example, benzene sulfonic acid or methanesulfonic acid. The pH of the reaction admixture higher than 6.0 causes low yields of catechol and hydroquinone.

The oxidation of phenol is preferably carried out at a temperature of 10° to 80°C, more preferably, 20° to 70°C. An oxidation temperature lower than 10°C results in a low reaction rate and low yield of catechol and hydroquinone. Also, the oxidation of phenol at a temperature higher than 80°C causes an increase in the amount of undesirable byproducts.

The reaction admixture may be either in a homogeneous solution phase or in a heterogeneous system in which a portion of phenol is separated from the reaction solution due to its small solubility in water.

The aqueous hydrogen peroxide solution may be added by drops or at once to the reaction system. When added by drops, the addition is carried out over a period of time, for example, 5 minutes, 10 minutes or more while stirring. After the addition is completed the reaction admixture is preferably stirred for a short time, for example, 3 to 30 minutes, in response to the type and amount of the catalyst used, concentrations of phenol and hydrogen peroxide, and pH and temperature of the reaction admixture.

After the complete oxidation of phenol, the resultant catechol and hydroquinone and the unreacted phenol are isolated from the reaction admixture by way of extraction with an organic solvent, for example, methyl isobutyl ketone, n-butyl acetate and isopropyl ether, filtration and, then, separation using a separatory funnel.

Catechol and hydroquinone may be separated from the unreacted phenol by way of distillation, and the unreacted phenol is recovered.

The extraction residue contains the organic metal coordinate compound, acid and water and is available for the next operation. That is, the organic metal coordinate compound can be utilized for repeated oxidation operations, for example, 10 or more oxidation operations.

The advantages of the method of the present invention are summarized as follows.

1. The oxidation of phenol can be completed within a short time without the induction period.
2. Catechol and hydroquinone can be produced at a high yield (based on both the amounts of phenol and hydrogen peroxide used).
3. The oxidation conditions, pH and temperature, and type of the organic metal coordinate compounds can be selected over a wide range.
4. The ratio of yield of catechol to that of hydroquinone can be easily controlled within a range from 0.5 to 3.0 by varying the oxidation conditions and the type of the catalysts.
5. There is no danger in handling the aqueous hydrogen peroxide solution because low concentration of the aqueous hydrogen peroxide solutions can be used for the method of the present invention.
6. The resultant catechol and hydroquinone can be easily isolated from the reaction admixture because the oxidation is carried out in an aqueous medium and, therefore, the products can be separated in a conventional manner, for example, extraction, filtration, separation using a separatory funnel and distillation.
7. The extraction residue which contains the organic metal coordinate compound, acid and water and the unreacted phenol can be recovered and re-utilized for the next operation. This is effective to prevent creation of pollution due to the process for producing catechol and hydroquinone.

The present invention will be illustrated in detail by the following examples.

EXAMPLE 1

An aqueous solution of a chelate compound was prepared by reacting 4.00 g (0.016 mole) of copper (II) sulfate pentahydrate with 0.0198 g (0.00018 mole) of catechol in 500 ml of water which have been adjusted to a pH of 3.0 by adding a small amount of sulfuric acid, at a temperature of 50°C. To the aqueous solution thus prepared were added 47 g (0.5 mole) of phenol. 13.6 g (0.12 mole) of an aqueous solution containing 30% by weight of hydrogen peroxide was added by drops, to the aqueous solution containing the chelate compound and phenol over a period of 10 minutes while stiring, and thereafter, the admixture thus prepared was stirred for 10 minutes to oxidize the phenol and produce catechol and hydroquinone.

The reaction admixture was mixed with 1,000 g of methyl isobutyl ketone to extract a mixture of the resultant catechol and hydroquinone and unreacted phenol from the reaction admixture. The extraction mixture was separated from the extraction residue containing the chelate compound in water acidified with sulfuric acid. The extraction mixture was subjected to distillation to isolate the resultant catechol and hydroquinone from the unreacted phenol and methyl isobutyl ketone. The yields of the catechol and hydroquinone were determined by gas chromatography. The distillation product contained 3.97 g (0.0361 mole) of catechol and 2.88 g (0.0262 mole) of hydroquinone. The ratio of the yield in moles of catechol to that of hydroquinone thus produced was 1.38. This ratio will be referred to as "yield ratio of catechol to hydroquinone" hereinafter. The ratio of the sum of the yield in moles of catechol and hydroquinone to the amount in moles of hydrogen peroxide used in the above-stated oxidation was 51.9%. The above ratio will be referred to hereinafter as "sum of yields of catechol and hydroquinone based on hydrogen peroxide used."

Additionally, the same procedures as mentioned above were repeated except that after hydrogen peroxide was added by drops, the reaction admixture was stirred for 5, 15, 20, 30 or 60 minutes. The yields of catechol and hydroquinone were substantially the same although the stirring times differed. This indicates that the production of catechol and hydroquinone was completed within a short stirring time of 5 minutes.

EXAMPLE 2

The extraction residue obtained in Example 1 was used as an aqueous solution containing the chelating compound. 47 g (0.5 mole) of phenol were added to the extraction residue and then, 13.6 g (0.12 mole) of 30% hydrogen peroxide was added at once to oxidize phenol and produce catechol and hydroquinone. The reaction admixture was stirred at a temperature of 50°C for 20 minutes. The resultant catechol and hydroquinone were separated by the same procedure as in Example 1.

The same procedures as stated above were repeated 9 times, each using the extraction residue produced by the preceding reaction. Table 1 shows the average yields in grams of catechol and hydroquinone, average yield ratio of catechol to hydroquinone, and average sum of the yields in moles of catechol and hydroquinone with respect to the amount, in moles, of hydrogen peroxide used, in the 10 operations.

Table 1

| Average yield (g) | | Average yield ratio of catechol to hydroquinone | Average sum of yields of catechol and hydroquinone based on hydrogen peroxide used (%) |
|---|---|---|---|
| Catechol | Hydroquinone | | |
| 3.82 (0.0347 mole) | 3.06 (0.0278 mole) | 1.25 | 52.1 |

EXAMPLES 3 AND 4

In Example 3, the same procedures as in Example 1 were repeated using a chelate compound prepared from 20 g (0.08 mole) of copper (II) sulfate pentahydrate and 3.56 g (0.04 mole) of D,L-β-alanine. In Example 4, the same procedures as in Example 1 were repeated ten times in the same manner as in Example 2. The results are shown in Table 2.

Table 2

| Example | Yield (g) | | Yield ratio of catechol to hydroquinone | Sum of yields of catechol and hydroquinone based on hydrogen peroxide used (%) |
|---|---|---|---|---|
| | Catechol | Hydroquinone | | |
| 3 | 3.40 (0.0309 mole) | 3.73 (0.0339 mole) | 0.91 | 54.0 |
| 4 (average of 10 experiments) | 3.54 (0.0322 mole) | 3.99 (0.0363 mole) | 0.89 | 57.0 |

EXAMPLE 5

The same procedures as in Example 1 were repeated except that the chelate compound was prepared from 54.8 g (0.2 mole) of chromium (II) sulfate heptahydrate and 0.88 g (0.008 mole) of catechol.

The results are shown in Table 3.

Table 3

| Yield (g) | | Yield ratio of catechol to hydroquinone | Sum of yields of catechol and hydroquinone based on hydrogen peroxide used (%) |
|---|---|---|---|
| Catechol | Hydroquinone | | |
| 3.26 (0.0296 mole) | 1.70 (0.0155 mole) | 1.92 | 37.6 |

EXAMPLE 6

The same operations as in Example 5 were repeated using a commercial nicotinic amide copper (II) in an amount of 0.2 mole calculated in terms of the copper atom instead of catechol chromium (II).

The results are shown in Table 4.

Table 4

| Yield (g) | | Yield ratio of catechol to hydroquinone | Sum of yields of catechol and hydroquinone based on hydrogen peroxide used (%) |
|---|---|---|---|
| Catechol | Hydroquinone | | |
| 2.97 (0.0270 mole) | 3.00 (0.0273 mole) | 0.990 | 45.2 |

EXAMPLE 7

The same operations as in Example 5 were repeated using copper (II) nicotinate in an amount of 0.1 mole calculated in terms of the copper atom instead of the catechol chromium (II).

Table 5 shows the results.

Table 5

| Yield (g) | | Yield ratio of catechol to hydroquinone | Sum of yields of catechol and hydroquinone based on $H_2O_2$ used (%) |
|---|---|---|---|
| Catechol | Hydroquinone | | |
| 3.38 | 2.64 | | |

Table 5-continued

| Yield (g) | | Yield ratio of catechol to hydroquinone | Sum of yields of catechol and hydroquinone based on H₂O₂ used (%) |
|---|---|---|---|
| Catechol | Hydroquinone | | |
| (0.0307 mole) | (0.0240 mole) | 1.28 | 45.6 |

EXAMPLES 8 THROUGH 12

In Example 8, 125 ml of an aqueous solution of sulfuric acid with a pH of 3.0 was heated to a temperature of 45°C. At this temperature, 1.1 g (0.0044 mole) of copper (II) sulfate pentahydrate and 0.0256 g (0.0002 mole) of α-thiophenic acid as a ligand were added to the aqueous solution to prepare a coordinate compound, copper (II) α-thiophenate. Thereafter, 14.2 g (0.106 mole) of an aqueous solution containing 70% by weight of phenol was admixed with the chelate compound aqueous solution. An aqueous solution of 30% by weight of hydrogen peroxide in an amount of 3.0 g (0.0266 mole) was added by drops, over a 5 minute period to the admixture prepared above, while stirring and the reaction admixture was further stirred for 25 mminutes to produce catechol and hydroquinone. The resultant catechol and hydroquinone were isolated by the same operations as in Example 1.

The same operations as in Example 8 were repeated using, instead of α-thiophenic acid, o-phenanthroline (Example 9), nicotinic amide (Example 10) ethylenediamine (Example 11) and pyridine (Example 12).

The results are shown in Table 6.

Table 6

| Ex. No. | Ligand | Yield (g) | | Yield ratio of catechol to hydroquinone | Sum of yields of catechol and hydroquinone based on H₂O₂ used (%) |
|---|---|---|---|---|---|
| | | Catechol | Hydroquinone | | |
| 8 | δ-Thiophenic acid | 0.742 | 0.672 | 1.10 | 48.3 |
| 9 | o-Phenanthroline | 0.781 | 0.684 | 1.14 | 50.1 |
| 10 | Nicotinic amide | 0.752 | 0.667 | 1.13 | 48.5 |
| 11 | Ethylenediamine | 0.768 | 0.694 | 1.11 | 50.0 |
| 12 | Pyridine | 0.687 | 0.534 | 1.29 | 41.7 |

EXAMPLES 13 THROUGH 20

In Example 13, the same procedures as in Example 1 were repeated using a coordinate compound prepared from 20 g (0.08 mole) of copper (II) sulfate pentahydrate and 0.08 mole of pyridine, and 15.0 g (0.16 mole) of phenol.

The same operations as in Example 13 were repeated seven times using, instead of pyridine, 0.08 mole of α-thiophenic acid (Example 14), o-phenenthroline (Example 15), salicylic aldehyde (Example 16), thiosalicyclic acid (Example 17), D,L-α-alanine (Example 18), 0.008 mole of ethylenediamine(Example 19) and 0.08 mole of ε-caprolactam (Example 20).

The results are shown in Table 7.

Table 7

| Ex. No. | Ligand | Yield (g) | | Sum of yields of catechol and hydroquinone based on H₂O₂ used (%) |
|---|---|---|---|---|
| | | Catechol | Hydroquinone | |
| 13 | Pyridine | 2.57 | 3.15 | 43.3 |
| 14 | α-Thiophenic acid | 4.26 | 1.91 | 46.7 |
| 15 | o-Phenanthroline | 3.50 | 2.70 | 47.0 |
| 16 | Salicyclic aldehyde | 3.91 | 2.71 | 50.2 |
| 17 | Thiosalicyclic acid | 4.01 | 2.52 | 49.5 |
| 18 | D,L-α-alanine | 3.87 | 3.11 | 52.9 |
| 19 | Ethylenediamine | 4.06 | 3.32 | 55.9 |
| 20 | ε-Caprolactam | 2.70 | 1.36 | 30.8 |

COMPARISON EXAMPLE 1

An aqueous solution of 35% by weight of hydrogen peroxide was added by drops in an amount of 0.028 mole calculated in terms of hydrogen peroxide, into an aqueous solution of 0.5 mole of phenol, 0.006 mole of sulfuric acid and 0.004 mole of phosphoric acid in 100 ml of water at a temperature of 50°C, while stirring. The reaction admixture thus prepared was further stirred for 6 hours at 50°C. However, no catechol and hydroquinone were produced.

The same operations as stated above were repeated using 50 ml of water. No catechol and hydroquinone were observed in the reaction admixture.

COMPARISON EXAMPLE 2

The same operations as in Example 5, were repeated except that 60 g (0.24 mole) of copper (II) sulfate pentahydrate was used instead of 0.2 mole of chromium sulfate heptahydrate, no catechol was used, and after the addition of the aqueous hydrogen peroxide solution was completed, the reaction admixture was stireed for 60 minutes. Portions of the admixture were withdrawn at stages of 10, 20, 30, 40, 50 and 60 minutes after the addition of the hydrogen peroxide, to determine the yield of catechol and hydroquinone. The results are shown in Table 8.

Table 8

| Sampling stage | Yield (g) | | Sum of yields of catechol and hydroquinone based on H₂O₂ used (%) |
|---|---|---|---|
| | Catechol | Hydroquinone | |
| 10 mins | 0 | 0 | 0 |
| 20 mins | 0 | 0 | 0 |
| 30 mins | 0 | 0 | 0 |
| 40 mins | trace | 1.19 | 9.0 |
| 50 mins | 1.37 | 2.22 | 27.2 |
| 60 mins | 1.40 | 2.24 | 27.5 |

Table 8 shows that the yields of catechol and hydroquinone are very low even 60 minutes after the start of the reaction. This means that the absence of the catechol copper (II) at the start of the reaction results in a very low yield of catechol and hydroquinone even if catechol copper (II) is produced at a later stage of the reaction.

EXAMPLE 21

The same operations as in Comparison Example 2 were repeated except that 10 minutes after the addition of aqueous hydrogen peroxide solution was completed, 0.00018 mole of catechol was added into the reaction admixture which contains copper sulfate (II), to prepare catechol copper (II) acting as the catalyst.

Portions of the reaction admixture were sampled at stages of 5, 10, 15 and 20 minutes after the complete addition of the aqueous hydrogen peroxide solution, to determine the yields of catechol and hydroquinone.

The results are shown in Table 9.

Table 9

| Sampling stage | Yield (g) Catechol | Hydroquinone | Sum of yields of catechol and hydroquinone based on $H_2O_2$ used (%) |
|---|---|---|---|
| 5 mins | 0 | 0 | 0 |
| 10 mins | 0 | 0 | 0 |
| 15 mins | 3.90 | 2.24 | 46.5 |
| 20 mins | 4.08 | 2.45 | 49.4 |

Table 9 shows that the production of catechol and hydroquinone were remarkably accelerated by the addition of catechol. This indicates that the catechol thus added is connected to the chelate compound, catechol copper (II), within a very short time and that the chelate compound immediately accelerates the oxidation of phenol.

EXAMPLES 22 THROUGH 29

In Example 22, the same operations as in Example 5 were repeated except that the chelate compound was prepared from 0.014 g (0.00005 mole) of iron (II) sulfate heptahydrate and 0.02 g (0.000018 mole) of catechol, the reaction admixture had a weight of 140 g, a temperature of 45°C and a pH of 3.5, phenol was in a concentration of 8.05% based on the weight of the reaction admixture, ratio of the amount in moles of phenol to that of hydrogen peroxide was 2, the aqueous solution of hydrogen peroxide was added, by drops, into the reaction admixture over a 5 minutes period, and after the addition of the aqueous hydrogen peroxide solution was completed, the reaction admixture was stirred for 25 minutes at 45°C.

The same procedures as in Example 22 were repeated twice except that the ratio of the amount in moles of phenol to that of hydrogen peroxide was 4 (Example 23) and 6 (Example 24).

Further the same procedures as in Example 22 were repeated twice except that the concentration of phenol was 12.0% based on the weight of the reaction admixture and the ratio of the amount in moles of phenol to that of hydrogen peroxide was 2 (Example 25) and 4 (Example 26).

Separately, the same procedures as in Example 22 were repeated three times except that the concentration of phenol was 23.9% based on the weight of the reaction admixture and the ratio of the amount in moles of phenol to that of hydrogen peroxide was 2 (Example 27), 4 (Example 28) and 6 (Example 29).

The results are shown in Table 10.

Table 10

| Ex. No. | Concentration of phenol (%) | Mole ratio phenol/ $H_2O_2$ | Yield (g) Catechol | Hydroquinone | Yield ratio of catechol to hydroquinone | Sum of yields of catechol and hydroquinone based on $H_2O_2$ used (%) |
|---|---|---|---|---|---|---|
| 22 |  | 2 | 1.95 | 1.35 | 1.44 | 50.0 |
| 23 | 8.05 | 4 | 1.17 | 0.850 | 1.38 | 61.0 |
| 24 |  | 6 | 0.813 | 0.502 | 1.62 | 59.5 |
| 25 | 12.0 | 2 | 2.97 | 1.97 | 1.51 | 50.2 |
| 26 |  | 4 | 1.69 | 1.14 | 1.48 | 57.4 |
| 27 |  | 2 | 5.03 | 2.94 | 1.71 | 40.7 |
| 28 | 23.9 | 4 | 3.42 | 2.08 | 1.64 | 56.2 |
| 29 |  | 6 | 2.43 | 1.39 | 1.75 | 58.5 |

EXAMPLES 30 THROUGH 34

The same procedures as in Example 5 were repeated five times except that the chelate compound was prepared from 0.011 g (0.00004 mole) of iron (II) sulfate heptahydrate and 0.002 g (0.000018 mole) of catechol in 87 ml of water adjusted with sulfuric acid to pHs of 1.9 (Example 30), 2.5 (Example 31), 3.5 (Example 32), 4.0 (Example 33) and 5.0 (Example 34) at a temperature of 45°C, 0.106 mole of phenol in 14.3 ml of 70% phenol aqueous solution was oxidized with 0.0266 mole of hydrogen peroxide by adding dropwise, an aqueous hydrogen peroxide solution over a 5 minutes period, and the reaction admixture was stirred for 25 minutes after the addition of the aqueous hydrogen peroxide solution was completed.

Table 11 shows the results.

Table 11

| Ex. No. | pH | Yield (g) Catechol | Hydroquinone | Yield ratio of catechol to hydroquinone | Sum of yields of catechol and hydroquinone based on $H_2O_2$ used (%) |
|---|---|---|---|---|---|
| 30 | 1.9 | 1.03 | 0.620 | 1.66 | 56.4 |
| 31 | 2.5 | 1.11 | 0.659 | 1.68 | 60.5 |
| 32 | 3.5 | 1.01 | 0.707 | 1.44 | 58.7 |
| 33 | 4.0 | 1.01 | 0.697 | 1.45 | 58.3 |
| 34 | 5.0 | 1.03 | 0.714 | 1.44 | 59.6 |

From Table 11, it is observed that in the pH range of 1.9 to 5.0, the yield ratio of catechol to hydroquinone varies.

EXAMPLES 35 THROUGH 41

The same operations as in Example 5 were repeated seven times except that the chelate compound was prepared from 0.011 g (0.00004 mole) of iron (II) sulfate heptahydrate and 0.00004 mole of a ligand compound selected from the group consisting of $\beta$-alanine (Example 35), o-phenanthroline (Example 36), isocinchomeronic acid (Example 37), nicotinic acid (Example 38), nicotinic amide (Example 39), α-thiophenic acid (Example 40) and 2,2',2''-trihydroxyethylamine (Example 41), in 87 ml of water at a pH of 3.0, 0.106 mole of phenol in 14.3 ml of 70% phenol aqueous solution was oxidized by adding in drops, an aqueous solution containing 0.0266 mole of hydrogen peroxide over a 5 minutes period, and the reaction admixture was stirred for 25 minutes after the addition of the aqueous hydrogen peroxide solution was completed.

Table 12 shows the results.

Table 12

| Ex. No. | Ligand | Yield (g) Catechol | Yield (g) Hydro-quinone | Yield ratio of catechol to hydro-quinone | Sum of fields of catechol and hydro-quinone based on $H_2O_2$ used (%) |
|---|---|---|---|---|---|
| 35 | β-Alanine | 1.04 | 0.665 | 1.56 | 58.3 |
| 36 | o-Phenanthroline | 1.03 | 0.711 | 1.45 | 59.5 |
| 37 | Isocincho-meronic acid | 0.989 | 0.673 | 1.47 | 56.8 |
| 38 | Nicotinic acid | 0.946 | 0.635 | 1.49 | 54.0 |
| 39 | Nicotinic amide | 1.05 | 0.722 | 1.46 | 60.6 |
| 40 | α-Thiophenic acid | 1.07 | 0.708 | 1.51 | 60.8 |
| 41 | 2,2',2''-tri-hydroxyethyl amine | 0.995 | 0.639 | 1.56 | 55.8 |

EXAMPLE 42

12.5 ml of a 80% aqueous phenol solution containing 0.106 mole of phenol, and 0.014 g (0.00005 mole) of iron (II) sulfate heptahydrate and 0.0055 g (0.00005 mole) of catechol were added to 84.5 g of water which had been adjusted with sulfuric acid to a pH of 3.5. The admixture thus prepared was changed into a heat-insulated reaction vessel and heated to a temperature of 45°C. At this temperature, a 30% hydrogen peroxide aqueous solution containing 0.0266 mole of hydrogen peroxide was added to the admixture within 1 minute. The oxidation of the phenol started immediately while rapidly generating heat. The temperature of the reaction admixture reached a maximum about 59°C about 10 minutes after the addition of the aqueous hydrogen peroxide aqueous solution was completed. When the temperature of the reaction admixture reached the maximum point, the reaction was completed. The resultant catechol and hydroquinone and the unreacted phenol were extracted with 200 g of n-butyl acetate in the same manner as in Example 1. The extraction residue contained the chelate compound, catechol iron (II) and had a temperature of 45°C.

The same process as mentioned above was repeated 9 times except that phenol and hydrogen peroxide in the same amounts as those mentioned above were added to the extraction residue obtained in the preceding process, without heating the reaction admixture.

Catechol and hydroquinone were isolated from the extraction mixture in the same method as in Example 1.

The yields of catechol and hydroquinone in the seventh through tenth processes were determined. The results are shown in Table 13.

Table 13

| Process No. | Yield (g) Catechol | Yield (g) Hydro-quinone | Yield ratio of catechol to hydro-quinone | Sum of fields of catechol and hydroquinone based on $H_2O_2$ used (%) |
|---|---|---|---|---|
| 7 | 1.05 | 0.743 | 1.41 | 61.3 |
| 8 | 1.03 | 0.740 | 1.39 | 60.5 |
| 9 | 1.06 | 0.755 | 1.40 | 62.0 |
| 10 | 1.03 | 0.732 | 1.41 | 60.2 |

Table 13 shows that the chelate compound, catechol iron (II), can be repeatedly used as the catalyst without a decrease in catalytic activity thereof.

EXAMPLES 43 AND 44 AND COMPARISON EXAMPLES 3 AND 4

In Example 43, the same operations as in Example 1 were repeated except that 0.011 g (0.00004 mole) of iron (II) sulfate heptahydrate, 0.002 g (0.000018 mole) of catechol and 14.3 ml of 70% phenol aqueous solution were added into 85 ml of water which had been adjusted to a pH of 3.5 with sulfuric acid, at a temperature of 20°C. Thereafter, 3.01 g of a 30% hydrogen peroxide aqueous solution containing 0.0266 mole of hydrogen peroxide was added by drops, over a period of 5 minutes into the admixture prepared above, while stirring. The reaction admixture was further stirred for 25 minutes after the addition of the aqueous hydrogen peroxide solution was completed.

In Comparison Example 3, the same operations as in Example 43 were repeated using no catechol.

In Example 44, the same operations as in Example 43 were carried out using iron (II) sulfate heptahydrate in an amount of 0.11 g (0.0004 mole).

In Comparison Example 4, the same procedures as in Example 44 were repeated using no catechol.

The results are shown in Table 14.

Table 14

| Example No. | Iron (II) sulfate heptahydrate (g) | Catechol | Yield (g) Catechol | Yield (g) Hydroquinone | Yield ratio of catechol to hydroquinone | Sum of yields of catechol and hydroquinone based on $H_2O_2$ used (%) |
| --- | --- | --- | --- | --- | --- | --- |
| 43 | 0.011 | added | 0.786 | 0.256 | 3.07 | 35.6 |
| Comp. Ex. 3 | | none | 0.613 | 0.235 | 2.61 | 29.0 |
| 44 | 0.11 | added | 1.00 | 0.643 | 1.56 | 56.2 |
| Comp. Ex. 4 | | none | 0.891 | 0.568 | 1.57 | 49.9 |

Table 14 clearly shows that the chelate compound, catechol iron (II) promoted the production of catechol and hydroquinone to a greater extent than that of iron (II) sulfate.

EXAMPLES 45 AND 46 AND COMPARISON EXAMPLES 5 AND 6

In Example 45, the same operations as in Example 42 were repeated except that 12.5 ml of the 80% phenol aqueous solution containing 0.106 mole of phenol, 0.014 g (0.00005 mole) of the iron (II) sulfate heptahydrate and 0.003 g of catechol were added to 84.5 g of water which had been adjusted with sulfuric acid to a pH of 1.6. As the aqueous hydrogen peroxide solution was added, the temperature of the reaction admixture increased due to generation of heat. About 3 minutes after the completion of the addition of the aqueous hydrogen peroxide solution, the reaction admixture reached a maximum temperature of 58°C and reaction was completed.

In Comparison Example 5, the same process as in Example 45 was repeated using no catechol. Heat-generation was observed about 9 minutes after completion of the addition of the aqueous hydrogen peroxide solution, and the temperature of the reaction admixture reached a maximum point of 58°C about 11 minutes after the completion of the addition, and at that time, the reaction was completed.

In Example 46, the same procedures as in Example 45 were carried out except that the water was acidified to a pH of 1.7 and initially had a temperature of 20°C, and catechol was used in an amount of 0.005 g.

The addition of the aqueous hydrogen peroxide solution immediately caused heat-generation in the reaction admixture. The reaction admixture reached a maximum temperature of 37°C about 10 minutes after the complete addition of the aqueous hydrogen peroxide solution and reaction was completed.

In Comparison Example 6, the same operations as in Example 46 were carried out using no catechol. No heat generation was observed even 60 minutes after the complete addition of the aqueous hydrogen peroxide solution. This indicates that substantially no reaction occurred.

Table 15 shows the yields of catechol and hydroquinone in the above examples and comparison examples.

Table 15

| Example No. | Reaction starting temperature (°C) | pH | Yield (g) Catechol | Yield (g) Hydroquinone | Yield ratio of catechol to hydroquinone | Sum of yields of catechol and hydroquinone based on $H_2O_2$ used (%) |
| --- | --- | --- | --- | --- | --- | --- |
| 45 | 45 | 1.6 | 1.02 | 0.550 | 1.85 | 53.7 |
| Comp. Ex. 5 | | | 0.962 | 0.497 | 1.94 | 49.9 |
| 46 | 20 | 1.7 | 1.01 | 0.442 | 2.29 | 49.6 |
| Comp. Ex. 7 | | | trace | trace | — | — |

Table 15 shows that the chelate compound, catechol iron (II) was more effective for promoting the production of catechol and hydroquinone that iron (II) sulfate, especially, at a low temperature.

EXAMPLE 47

This example relates to a method wherein catechol and hydroquinone were produced by adding a chelate compound to a mixture of phenol and hydrogen peroxide.

11.3 g (0.12 mole) of phenol and 3.4 g of a 30% hydrogen peroxide aqueous solution containing 0.03 mole of hydrogen peroxide were added to 125 ml of water which had been adjusted to a pH of 3.5 with sulfuric acid, at a temperature of 50°C. 5 ml of aqueous solution containing a chelate compound which had been prepared from 0.014 g (0.00005 mole) of iron (II) sulfate heptahydrate and 0.0055 g (0.00005 mole) of catechol, were added to the admixture prepared above. After the addition was completed, the reaction admixture was stirred for 20 minutes. The resultant catechol and hydroquinone were isolated by the same method as in Example 1.

Table 16 shows the results.

Table 16

| Yield (g) | | Yield ratio of catechol to hydroquinone | Sum of yields of catechol and hydroquinone based on $H_2O_2$ used (%) |
|---|---|---|---|
| Catechol | Hydroquinone | | |
| 1.18 | 0.790 | 1.49 | 59.7 |

EXAMPLES 48 AND 49

The same operation as in Example 42 were repeated twice using, instead of iron (II) sulfate heptahydrate, 0.010 g (0.00005 mole) of iron (II) chloride tetrahydrate (Example 48) and 0.0135 g (0.00005 mole) of iron (III) chloride hexahydrate (Example 49). In every example, vigorous heat generation was observed just when the hydrogen peroxide was added to the admixture of the chelate compound and phenol in water. Three minutes after completion of the hydrogen peroxide addition, the reaction admixture reached a maximum temperature of about 59°C, and the reaction was completed.

Table 17 shows the results.

Table 17

| Ex. No. | Metal Salt | Yield | | Yield ratio of catechol to hydroquinone | Sum of yields of catechol and hydroquinone based on $H_2O_2$ used (%) |
|---|---|---|---|---|---|
| | | Catechol | Hydroquinone | | |
| 48 | $FeCl_2 \cdot 4H_2O$ | 1.02 | 0.74 | 1.38 | 60.2 |
| 49 | $FeCl_2 \cdot 6H_2O$ | 1.03 | 0.72 | 1.43 | 59.8 |

EXAMPLES 50 THROUGH 56

In Example 50, the same operations as in Example 42 were repeated except that 0.0066 g (0.000054 mole) of salicylic aldehyde was used instead of catechol, iron (II) sulfate heptahydrate was employed in an amount of 0.015 g (0.000054 mole) and the reaction admixture had an temperatures of 50°C at the start of the reaction.

The same operations as in Example 50 were repeated six times respectively using, instead of sulicylic aldehyde, 0.000040 mole of o-aminophenol (Example 51), 0.000054 mole of salicylic acid (Example 52), 0.000081 mole of o-nitrophenol (Example 53), 0.000168 mole of pyridine (Example 54), 0.000054 mole of 8-hydroxyquinoline (Example 55) and 0.000054 mole of ethylenediaminetetraacctic acid (EDTA) (Example 56).

In Example 56, the pH of the chelate compound aqueous solution was adjusted to 3.5 by adding a small amount of N-sodium hydroxide aqueous solution.

In every example, the temperature of the reaction admixture reached a maximum point of 64° to 65°C within 10 minutes after the addition of aqueous hydrogen peroxide solution was completed, and at this temperature, the reaction was completed.

The yields of catechol and hydroquinone in every example are indicated in Table 18.

Table 18

| Example No. | Ligand | | Yield (g) | | Yield ratio of catechol to hydroquinone | Sum of yields of catechol and hydroquinone based on $H_2O_2$ used (%) |
|---|---|---|---|---|---|---|
| | Name | Amount (mole) | Catechol | Hydroquinone | | |
| 50 | Salicylic aldehyde | 0.000054 | 0.963 | 0.688 | 1.40 | 57.5 |
| 51 | o-Aminophenol | 0.000040 | 0.963 | 0.664 | 1.45 | 56.7 |
| 52 | Salicyclic acid | 0.000054 | 0.965 | 0.643 | 1.50 | 56.0 |
| 53 | o-Nitrophenol | 0.000081 | 0.919 | 0.676 | 1.36 | 55.6 |
| 54 | Pyridine | 0.000168 | 0.918 | 0.665 | 1.38 | 55.1 |
| 55 | 8-Hydroxyquinoline | 0.000054 | 0.970 | 0.703 | 1.38 | 58.3 |
| 56 | EDTA | 0.000054 | 0.877 | 0.613 | 1.43 | 51.9 |

Note: EDTA; Ethylenediaminetetraacetic acid

EXAMPLE 57

A chelate compound aqueous solution was prepared by by adding 6.00 g (0.0225 mole) of chromium (III) chloride hexahydrate and 0.166 g (0.00108 mole) of thiosalicylic acid into 86.5 g of water and adjusting the mixture to a pH of 3.5 with an aqueous N-ammonia solution. 13.68 ml of 80% phenol aqueous solution containing 0.116 mole of phenol was added to the chelate compound aqueous solution and the admixture was adjusted to a temperature of 60°C. At this temperature, 3.0 ml of aqueous hydrogen peroxide solution containing 0.0291 mole of hydrogen peroxide was added to the admixture within 1 minute. The addition of aqueous hydrogen peroxide solution immediately caused heat generation in the reaction admixture and the temperature of the reaction admixture was elevated to a maximum point of 70°C. The reaction admixture was stirred at 60 to 70°C for 25 minutes after the addition of the hydrogen peroxide was completed.

The resulted catechol and hydroquinone were isolated and determined by the same method as in Example 1. 0.714 g of catechol and 0.660 g of hydroquinone were obtained. The yield ratio of catechol to hydroquinone was 1.08 and the sum of yields of catechol and hydroquinone was 42.9% based on the amount in moles of hydrogen peroxide used.

EXAMPLES 58 THROUGH 62

In Example 58, a chelate compound aqueous solution was prepared by adding 6.00 g (0.0213 mole) of cobalt (II) sulfate heptahydrate and 0.099 g (0.0009 mole) of catechol into 86.5 g of water and adjusting the mixture to a pH of 3.0 with a 2N-sulfuric acid aqueous solution. 13.68 ml of a 80% phenol aqueous solution containing 0.116 mole of phenol were added into the chelate compound aqueous solution and the admixture thus prepared was adjusted to a temperature of 70°C. 3.0 ml of a 30% hydrogen peroxide aqueous solution containing 0.0291 mole of hydrogen peroxide was added to the admixture within 1 minute and, thereafter, the reaction admixture was stirred at a temperature of 70° to 80°C for 30 minutes.

The resultant catechol and hydroquinone were isolated and determined by the same method as in Example 1. The same operations as in Example 58 were repeated using, instead of catechol, 0.124 g (0.0009 mole) of salicylic acid (Example 59), 0.100 g (0.000540 mole) of isocinchomeronic acid (Example 60), 0.100 g (0.000999 mole) of 2-aminothiazole (Example 61) and 0.100 g (0.00109 mole) of thioglycollic acid (Example 62).

Table 19 shows the results.

The same procedures as in Example 63 were repeated six times using respectively, instead of salicylic amide, 0.00126 mole of pyridine (Example 64), 0.000689 mole of 8-hydroxyquinoline (Example 65), 0.000598 mole of mercaptobenzothiazole (Example 66), 0.00133 mole of thioacetamide (Example 67), 0.00131 mole of thiourea (Example 68), 0.000861 mole of dimethylglyoxime (Example 69). It should be noticed that in each of Examples 63, 66 and 69, the reaction admixture were charged into a heat-insulated reaction vessel and adjusted to a temperature of 45°C at the start of the reaction.

The results are shown in Table 20.

Table 20

| Example No. | Ligand Name | Amount (mole) | Yield (g) Catechol | Hydro-quinone | Yield ratio of catechol to hydroquinone | Sum of yields of catechol and hydroquinone based on $H_2O_2$ used (%) |
|---|---|---|---|---|---|---|
| 63 | Salicylic amide | 0.000729 | 1.008 | 0.660 | 1.53 | 52.1 |
| 64 | Pyridine | 0.00126 | 0.909 | 0.692 | 1.31 | 50.0 |
| 65 | 8-Hydorxyquinoline | 0.000689 | 0.862 | 0.683 | 1.26 | 48.3 |
| 66 | Mercapto-benzothiazole | 0.000598 | 0.777 | 0.547 | 1.42 | 41.4 |
| 67 | Thioacetamide | 0.00133 | 0.665 | 0.484 | 1.37 | 35.9 |
| 68 | Thiourea | 0.00131 | 0.602 | 0.464 | 1.30 | 33.3 |
| 69 | Dimethylglyoxime | 0.000861 | 0.746 | 0.573 | 1.30 | 41.2 |

Table 19

| Ex. No. | Ligand | Yield (g) Catechol | Hydro-quinone | Yield ratio of catechol to hydroquinone | Sum of yields of catechol and hydroquinone based on $H_2O_2$ used (%) |
|---|---|---|---|---|---|
| 58 | Catechol | 1.016 | 0.705 | 1.44 | 53.7 |
| 59 | Salicylic acid | 0.965 | 0.712 | 1.36 | 52.4 |
| 60 | Isocinchomeronic acid | 0.963 | 0.761 | 1.27 | 53.8 |
| 61 | 2-Aminothiazole | 0.927 | 0.677 | 1.37 | 50.1 |
| 62 | Thioglycollic acid | 0.986 | 0.667 | 1.48 | 51.6 |

EXAMPLES 63 THROUGH 69

In Example 63, the same operations as in Example 57 were carried out except that the coordinate compound was prepared from 1.00 g (0.00375 mole) of chromium (III) chloride hexahydrate and 0.100 g (0.000729 mole) of salicylic amide.

EXAMPLES 70 THROUGH 80

In Example 70, the same operations as in Example 50 were carried out using, instead of salicylic aldehyde, 0.000054 mole of anthranilic acid.

The same procedures as in Example 70 were repeated ten times using respectively, instead of anthranilic acid, 0.000054 mole of orthanilic acid (Example 71), 0.000054 mole of o-phenol sulfonic acid (Example 72), 0.000054 mole of α-nitroso-β-naphthol (Example 73), 0.000162 mole of α-picoline (Example 74), 0.000162 mole of 2,6-lutidine (Example 75), 0.000162 mole of quinoline (Example 76), 0.000054 mole of 2-hydroxyethylamine (Example 77), 0.000108 mole of ethylene cyanohydrin (Example 78), 0.000054 mole of oxamide (Example 79), and 0.000081 mole of diethylene glycol (Example 80).

The results are shown in Table 21.

Table 21

| Example No. | Ligand Name | Amount (mole) | Yield (g) Catechol | Hydro-quinone | Yield ratio of catechol to hydroquinone | Sum of yields of catechol and hydroquinone based on $H_2O_2$ used (%) |
|---|---|---|---|---|---|---|
| 70 | Anthranilic acid | 0.000054 | 0.931 | 0.651 | 1.43 | 55.1 |
| 71 | Orthanilic acid | 0.000054 | 0.941 | 0.667 | 1.41 | 56.0 |
| 72 | o-Phenol sulfonic acid | 0.000054 | 0.923 | 0.650 | 1.42 | 54.8 |
| 73 | α-Nitroso-β-naphthol | 0.000054 | 0.945 | 0.685 | 1.38 | 56.8 |
| 74 | α-Picoline | 0.000162 | 0.922 | 0.640 | 1.44 | 54.4 |
| 75 | 2,6-Lutidine | 0.000162 | 0.954 | 0.654 | 1.46 | 56.0 |
| 76 | Quinoline | 0.000162 | 0.940 | 0.653 | 1.44 | 55.5 |
| 77 | 2-Hydroxyethylamine | 0.000054 | 0.982 | 0.706 | 1.39 | 58.8 |
| 78 | Ethylene cyanohydrin | 0.000108 | 0.924 | 0.684 | 1.35 | 56.0 |
| 79 | Oxamide | 0.000054 | 0.967 | 0.706 | 1.37 | 58.3 |
| 80 | Diethylene glycol | 0.000081 | 0.929 | 0.678 | 1.37 | 56.0 |

EXAMPLES 81 THROUGH 85

In Example 81, the same procedures as in Example 57 were carried out except that the chelate compound aqueous solution was prepared by adding 0.000200 mole of copper (II) sulfate pentahydrate and 0.000400 mole of glutamic acid into 91.5 g of water and adjusting at the start of the reaction the mixture to a pH of 3.0 and a temperature of 70°C.

Further, the same procedures as in Example 81 were repeated four times using respectively, instead of glutamic acid, lysine (Example 82), methionine (Example 83), glycine (Example 84) and arginine (Example 85).

The pH of the chelate compound aqueous solution was 2.65 in Example 82, 2.32 in Example 83, 2.55 in Example 84 and 3.0 in Example 85.

The results are shown in Table 22.

Table 22

| Ex. No. | Ligand | Yield (g) Catechol | Yield (g) Hydroquinone | Yield ratio of catechol to hydroquinone | Sum of yields of catechol and hydroquinone based on $H_2O_2$ used (%) |
|---|---|---|---|---|---|
| 81 | Glutamic acid | 0.935 | 0.678 | 1.38 | 50.4 |
| 82 | Lysine | 0.774 | 0.600 | 1.29 | 42.9 |
| 83 | Methionine | 0.891 | 0.636 | 1.40 | 47.7 |
| 84 | Glycine | 0.825 | 0.644 | 1.28 | 45.9 |
| 85 | Arginine | 0.893 | 0.682 | 1.31 | 49.2 |

COMPARISON Example 7

An oxidation of phenol with hydrogen peroxide was carried out without addition of an organic ligand compound.

7.5 g (0.0797 mole) of phenol and 0.675 g (0.00243 mole) of iron (II) sulfate heptahydrate were added to 110 ml of water which had been adjusted to a pH of 3.6 by adding sulfuric acid, and the mixture was cooled with ice to a temperature lower than 5°C. 90 ml of an 1% by weight hydrogen peroxide aqueous solution containing 0.0265 mole of hydrogen peroxide was added to the cooled mixture. The reaction admixture was stirred for 24 hours. The resulting catechol and hydroquinone were isolated and determined by the same method as in Example 1. 1.136 g of catechol and 0.626 g of hydroquinone were obtained. The ratio of the yield of catechol to that of hydroquinone was 1.81 and the sum of the yields in moles of catechol and hydroquinone to the amount in moles of hydrogen peroxide used was 60.5%.

What we claim is:

1. A method for preparing catechol and hydroquinone, comprising the steps of:
   oxidizing phenol with 10 to 100 percent by mole based on the amount by mole of said phenol, of hydrogen peroxide in an aqueous medium at a temperature of 10° – 80°C. at a pH not higher than 6.0 in the presence of a catalyst consisting of at least one organic metal coordinate compound which consists of at least one organic ligand component coordinate-bonded with at least one metal atom component selected from the group consisting of iron, copper, chromium, and cobalt and selected from the group consisting of (a) any aromatic chelating compound selected from the group consisting of catechol, salicylic aldehyde, salicylic acid, thiosalicylic acid, o-aminophenol, salicylic amide, o-nitrophenol, anthranilic acid, orthanilic acid, o-phenol sulfonic acid, and α-nitroso-β-naphthol, (b) a heterocyclic monodentate coordinating compound selected from the group consisting of pyridine, picolines, lutidines and quinoline, (c) a heterocyclic polydentate coordinate compounds selected from the group consisting of nicotinic acid, nicotinic amide, isocinchomeronic acid, α-thiophenic acid, o-phenanthroline, 2-mercaptopyridine, 2-aminothiazole, 8-hydroxyquinoline, mercaptobenzothiazole and ε-caprolactam, and (d) aliphatic chelating compounds selected from the group consisting of ethylene diamine, D,L-α-alanine, D,L-β-alanine, 2,2',2''-trihydroxyethylamine, thioglycollic acid, thioacetamide, thiourea, 2,3-dimercapto-1-propanol, ethylenediaminetetraacetic acid, dimethylglyoxime, 2-hydroxyethylamine, ethylene cyanohydrin, oxamide, diethylene glycol, glutamic acid, lysine, methionine, glycine and arginine, said catalyst being in an amount of one-thirty to 100 percent by mole calculated in terms of said metal component contained therein, based on the amount by mole of said phenol, and isolating the resulting catechol and hydroquinone from said oxidation mixture.

2. A method according to claim 1 wherein said catalyst is a chelate of copper sulfate pentahydrate and catechol.

3. A method according to claim 1 wherein said catalyst is a chelate prepared from copper sulfate pentahydrate and D,L-β-alanine.

4. A method according to claim 1 wherein said catalyst is a chelate prepared from chromium sulfate heptahydrate and catechol.

5. A method according to claim 1 wherein said catalyst is copper nicotinate.

6. A method according to claim 1 wherein said catalyst is copper-α-thiophenate.

7. A method according to claim 1 wherein said catalyst is a chelate prepared from copper sulfate pentahydrate and a member selected from the group consisting of o-phenanthroline, nicotinic amide, ethylene diamine, pyridine, thiosalicylic acid, D,L-α-alanine, and ε-caprolactam.

8. A method according to claim 1 wherein said catalyst is a chelate prepared from iron sulfate heptahydrate and catechol.

9. A method according to claim 1 wherein said catalyst is a chelate prepared from iron sulfate heptahydrate and a member selected from the group consisting of β-alanine, o-phenanthroline, isocinchomeronic acid, nicotinic acid, nicotinic amide, α-thiophenic acid, and 2,2',2''-trihydroxyethylamine.

10. A method as claimed in claim 1, wherein said oxidation is carried out at a pH of 1 to 5.

11. A method as claimed in claim 1, wherein said oxidation temperature is from 20 to 70°C at the start thereof.

12. A method as claimed in claim 1, wherein the isolation of catechol and hydroquinone is effected by extracting with an organic solvent for catechol and hydroquinone.

13. A method as claimed in claim 12, wherein said extracting organic solvent is selected from the class consisting of methyl isobutyl ketone, n-butyl acetate and isopropyl ether.

* * * * *